(12) United States Patent
Karatsinides

(10) Patent No.: US 8,340,863 B2
(45) Date of Patent: Dec. 25, 2012

(54) VEHICLE PEDAL APPARATUS WITH USER ACTUATION SENSOR, AND RELATED OPERATING METHOD

(75) Inventor: Dimitri Spiro Karatsinides, Milford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 290 days.

(21) Appl. No.: 12/777,791

(22) Filed: May 11, 2010

(65) Prior Publication Data

US 2011/0282545 A1  Nov. 17, 2011

(51) Int. Cl.
*G06F 7/00* (2006.01)

(52) U.S. Cl. .......................................................... 701/36

(58) Field of Classification Search .................. 701/36, 701/51, 53; 73/760, 763, 768, 774, 118.01
See application file for complete search history.

(56) References Cited

U.S. PATENT DOCUMENTS

| | | | |
|---|---|---|---|
| 5,396,870 A * | 3/1995 | Beale | 123/399 |
| 5,526,786 A * | 6/1996 | Beck et al. | 123/357 |
| 6,474,753 B1 * | 11/2002 | Rieth et al. | 303/191 |
| 6,655,199 B1 * | 12/2003 | Smith | 73/114.01 |
| 6,684,987 B2 * | 2/2004 | Stachowski et al. | 188/156 |
| 8,005,588 B2 * | 8/2011 | Dower | 701/22 |
| 2002/0130790 A1 * | 9/2002 | Sherringham | 340/870.36 |
| 2003/0067215 A1 * | 4/2003 | Rieth et al. | 303/20 |
| 2005/0057087 A1 * | 3/2005 | Ahnafield | 303/20 |
| 2010/0037726 A1 * | 2/2010 | Beck | 74/514 |
| 2011/0036192 A1 * | 2/2011 | Wolterman | 74/473.16 |
| 2011/0126642 A1 * | 6/2011 | Stahle | 73/862.634 |

* cited by examiner

*Primary Examiner* — Faye M. Fleming
(74) *Attorney, Agent, or Firm* — Ingrassia Fisher & Lorenz, P.C.

(57) ABSTRACT

A pedal system for a vehicle is disclosed. The pedal system includes an accelerator pedal, a sensor, a sensor detection circuit, and a controller. The pedal has a footpad, and the pedal moves in response to user actuation of the footpad. The sensor, which is coupled to or integrated into the footpad, has a first state when the footpad is actuated and a second state when the footpad is not actuated. The sensor is independent of and distinct from any physical position sensors of the pedal. The detection circuit, which is electrically coupled to the sensor, can distinguish between the first state and the second state. The controller, which is coupled to the sensor detection circuit, controls operation of the vehicle in a manner that is influenced by the first state or the second state.

10 Claims, 5 Drawing Sheets

VEHICLE PEDAL APPARATUS WITH USER ACTUATION SENSOR, AND RELATED OPERATING METHOD

TECHNICAL FIELD

Embodiments of the subject matter described herein relate generally to vehicle pedal systems and related controllers. More particularly, embodiments of the subject matter relate to the use of a pedal sensor (other than traditional pedal position sensors) to determine whether or not the driver is physically actuating the pedal.

BACKGROUND

Foot-actuated control pedals for vehicles are well known. Most automobiles include an accelerator pedal for vehicle/engine speed or torque/power control, and a brake pedal for braking control. Manual transmission automobiles typically include a clutch pedal for engaging and disengaging the clutch to accommodate shifting of gears. Modern vehicles may utilize electrical and/or electromechanical sensors or detectors with control pedals. For example, sensors can be used to determine the amount of physical travel of a pedal (such as the accelerator pedal) caused by driver interaction; the sensor signals can then be used to control the vehicle/engine speed or other aspects of the vehicle. As another example, sensors can be used to determine the current physical position of a pedal (such as a brake pedal) caused by driver actuation; the sensor signals can then be used to control the brake system, generate brake lights, or the like.

Electronic sensor signals are usually collected, analyzed, and processed by one or more electronic control units (ECUs) onboard the host vehicle. For example, an engine control module (ECM) might be used to control various aspects of the vehicle's engine, such as the throttle position, the fuel/air intake system, stability systems, etc. The ECM could also be used to receive and process conventional sensor signals for one or more control pedals.

BRIEF SUMMARY

A pedal apparatus for a vehicle is provided. The pedal apparatus includes a foot pedal configured for physical movement in response to user actuation, and a sensor associated with the foot pedal. The sensor is configured to detect user actuation of the foot pedal, and lack thereof, independently of physical position of the foot pedal.

Also provided is a method of controlling operation of a vehicle having a foot pedal configured for physical movement in response to user actuation. The method obtains a sensor signal from a sensor associated with the foot pedal. The sensor signal is generated in a manner that is independent of, and not influenced by, physical position of the foot pedal. The method continues by analyzing the sensor signal to determine a user actuation status of the foot pedal. The method can then control operation of the vehicle in response to the user actuation status of the foot pedal.

A pedal system for a vehicle is also provided. The pedal system includes an accelerator pedal having a footpad, the accelerator pedal configured for physical movement in response to user actuation with the footpad. The pedal system also includes a sensor coupled to or integrated into the footpad, the sensor having a first state when the footpad is actuated and having a second state when the footpad is not actuated, and the sensor being independent of and distinct from any physical position sensors of the accelerator pedal. The pedal system also includes a sensor detection circuit electrically coupled to the sensor, and a controller coupled to the sensor detection circuit. The sensor detection circuit is configured to distinguish between the first state and the second state, and the controller is configured to control operation of the vehicle in a manner that is influenced by the first state or the second state.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The technology described here relates to the use of a sensor onboard a vehicle to detect when a foot pedal has been actuated by an operator. The pedal actuation sensor (or multiple sensors in some embodiments) are used in addition to conventional sensor or detector elements that detect the physical travel, physical position, or state of the foot pedal itself. Although the following description relates to an automotive system, the sensor technology can also be utilized in the context of other vehicles including, without limitation: watercraft; aircraft; trains; railway vehicles; spacecraft; and motorcycles.

Figure 1:
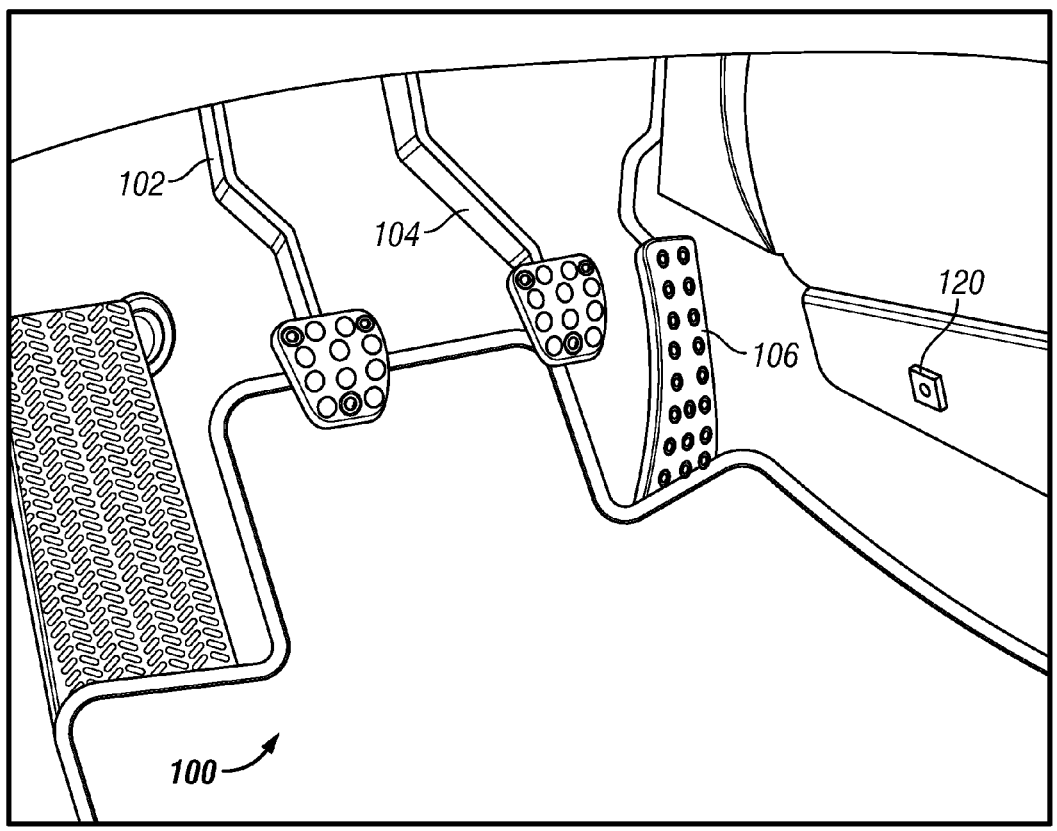
FIG. 1 is a perspective view of a vehicle footwell, showing three foot pedals.

FIG. 1 is a perspective view of a vehicle footwell 100 having three foot pedals located therein: a clutch pedal 102; a brake pedal 104; and an accelerator pedal 106. These foot pedals are actuated (pushed down) as needed to operate the vehicle, as is well understood. Using modern drive by wire, electronic control unit (ECU), electronic sensor, mechanical linkage, and electromechanical sensor technology, various control systems of the vehicle can react and respond to the real-time actuation state and status of the foot pedals 102, 104, 106. For example, the clutch is normally engaged and disengaged in response to manipulation of the clutch pedal 102, the braking system is normally activated in response to actuation of the brake pedal 104, and the engine or vehicle speed is normally regulated in response to actuation of the accelerator pedal 106.

Figure 2:
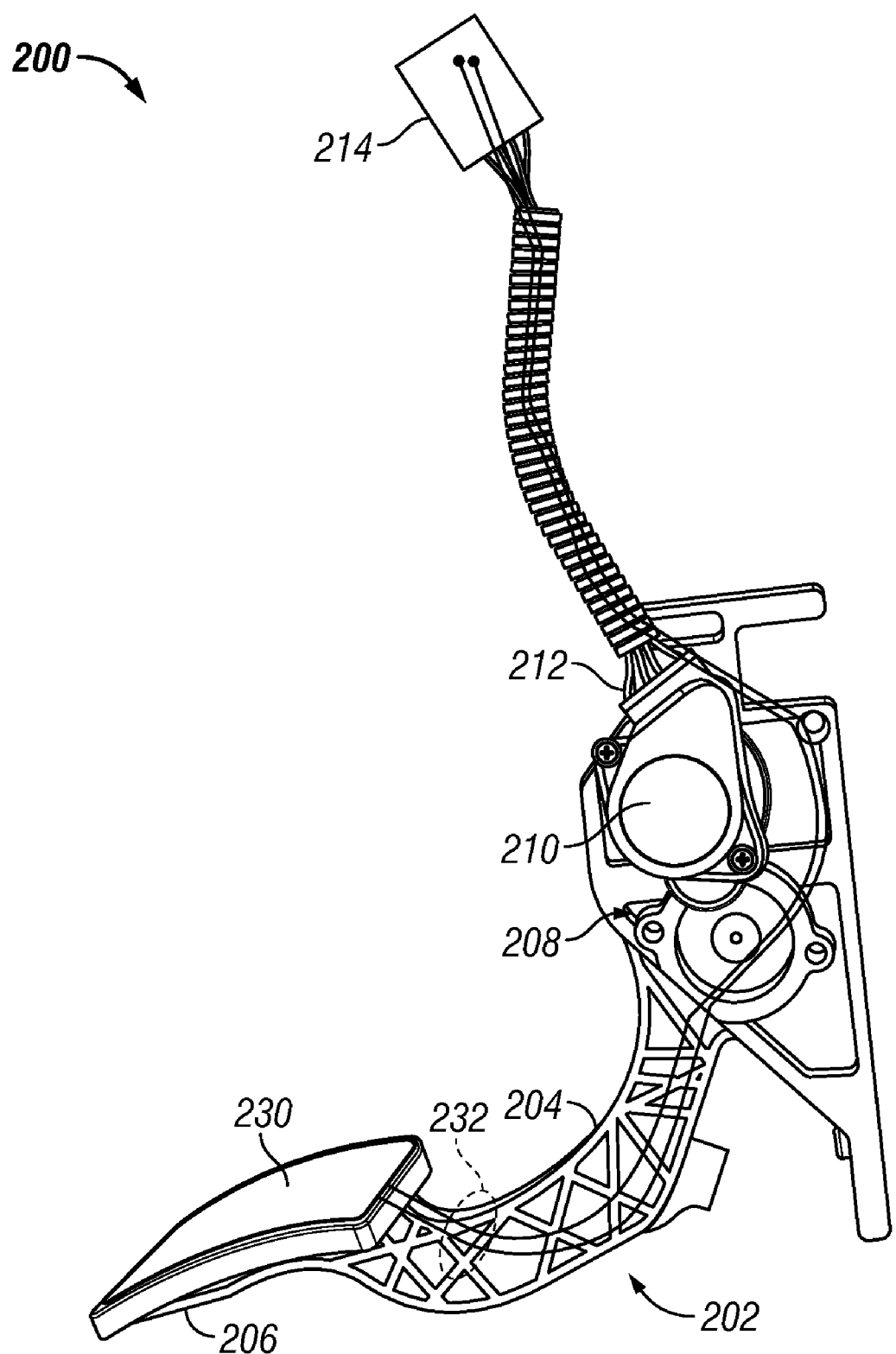
FIG. 2 is a perspective view of an exemplary foot pedal assembly having a force sensor coupled thereto.

FIG. 2 is a perspective view of an exemplary foot pedal assembly 200. The foot pedal assembly 200 could be realized as a clutch pedal assembly, a brake pedal assembly, or an accelerator pedal assembly. This particular embodiment of the foot pedal assembly 200 includes a foot pedal 202 having an arm 204 and an actuation footpad 206 located at the actuation end of the arm 204. The actuation footpad 206 may be coupled to the arm 204, or it may be integrally formed as an extension of the arm 204. The actuation footpad 206 is shaped and sized to accommodate the foot of the operator. As is well understood, the foot pedal 202 is configured for physical movement in response to user actuation (normally by way of the actuation footpad 206). The actuation force applied to most foot pedals under normal driving conditions will be within the range of about 15 to 45 Newtons.

This particular embodiment of the foot pedal 202 pivots about a hinge point that is generally located near the area 208. Thus, as the operator pushes down on the actuation footpad 206, the force exerted onto the actuation footpad 206 causes the arm 204 to pivot about its hinge point. The foot pedal assembly 200 may include a suitably configured position sensor 210 that indicates or measures the current physical position of the foot pedal 202 relative to some reference point, angle, and/or coordinate system. In practice, the position sensor 210 may include a rotating sensor element that moves in conjunction with the hinged end of the arm 204. The position sensor 210 has electrical leads 212 that allow the position sensor 210 to be monitored by one or more control modules or components. As shown in FIG. 2, the leads 212 may be terminated using an appropriate connector 214, plug, or similar feature.

It should be appreciated that the foot pedal 202 could utilize a different mechanism for converting the operator actuation force into an appropriate control signal. For example, the foot pedal 202 could use one or more linkages rather than a simple hinged arm 204. Moreover, the physical travel of the foot pedal 202 may correspond to an up/down movement rather than a pivoting movement, and the position sensor 210 could be arranged to measure, detect, or otherwise respond to the up/down position of the foot pedal 202 rather than its rotational position. The specific manner in which the foot pedal 202 is constructed and implemented may vary from one embodiment to another, and the subject matter presented here is not restricted or limited by the particular form or mechanical arrangement of the foot pedal 202, as will become apparent from the following description.

The foot pedal assembly 200 also includes at least one sensor 230 that is associated with the foot pedal 202. The sensor 230 is configured to detect, measure, react to, or otherwise respond to user actuation of the foot pedal 202 (and to lack of user actuation). Notably, the sensor 230 functions and operates independently of the position sensor 210 and independently of the actual physical position of the foot pedal 202. The illustrated embodiment employs a sensor 230 that is coupled to, integrated with, affixed to, or otherwise located on the actuation footpad 206. Although FIG. 2 depicts the sensor 230 residing on the exposed surface of the actuation footpad 206, the sensor 230 may instead be embedded under the surface of the actuation footpad 206, located under a rubber or plastic cover or shell of the actuation footpad 206, covered with a protective liner, or the like. The particular mechanical characteristics of the sensor 230 relative to the actuation footpad 206 may vary from one embodiment to another, as long as the sensing/detecting properties of the sensor 230 are not compromised.

The sensor 230 is designed to detect, measure, react to, or otherwise respond to an actuation force applied thereto (e.g., the force imparted to the actuation footpad 206 by an operator's foot). The sensor 230 has variable and detectable characteristics that react to actuation forces. For example, the sensor 230 might have variable resistance, capacitance, inductance, magnetic, and/or other detectable characteristics. In certain embodiments, the sensor is realized as an electronic force sensor having a variable resistance that is influenced by the amount of force applied to the sensor 230. Thus, the sensor 230 will have a first resistance (or a first defined resistance range) when no force is applied thereto, and a second resistance (or a second defined resistance range) when force is applied thereto. In other words, the sensor 230 has a first electrical characteristic state when the actuation footpad 206 is actuated and a second and different electrical characteristic state when the actuation footpad 206 is not actuated. Accordingly, the sensor 230 and/or the corresponding control logic, which is described in more detail below, can be calibrated or designed to distinguish between at least two actuation states: actuation of the foot pedal 202; and no actuation of the foot pedal 202. These different states can be determined by monitoring changes to the resistance of the sensor 230.

In alternate embodiments, the sensor 230 may be realized as an electronic pressure sensor that is configured to detect, measure, respond to, or react to an actuation pressure applied to the actuation footpad 206. Such an implementation may leverage conventional pressure sensing technologies. In yet another embodiment, the sensor 230 is realized as an electronic touch-sensitive pad that is configured to detect physical contact with the actuation footpad 206 and/or physical contact with the touch-sensitive pad itself. Such an embodiment may leverage conventional touch-sensitive pad or touch screen technologies. In yet other embodiments, the sensor 230 may be implemented as an electronic position sensor that is configured to detect at least one position on the contact surface of the actuation footpad 206 that is subjected to user actuation. Such a position sensor may be desirable to determine the specific area, zone, or section of the actuation footpad 206 that is engaged by the operator. In this context, a position sensor could be realized using conventional touch-sensitive pad or touch screen technologies. Moreover, certain embodiments of the foot pedal assembly 200 could utilize multiple sensors (of the same or different type) for purposes of detecting actual operator actuation of the foot pedal 202. For example, it may be desirable in some applications to deploy a plurality of smaller force sensors rather than one large force sensor. In other applications, it may be desirable to employ a hybrid or combined sensor arrangement having a force sensor layered with a position sensor and/or a pressure sensor.

Figure 3:
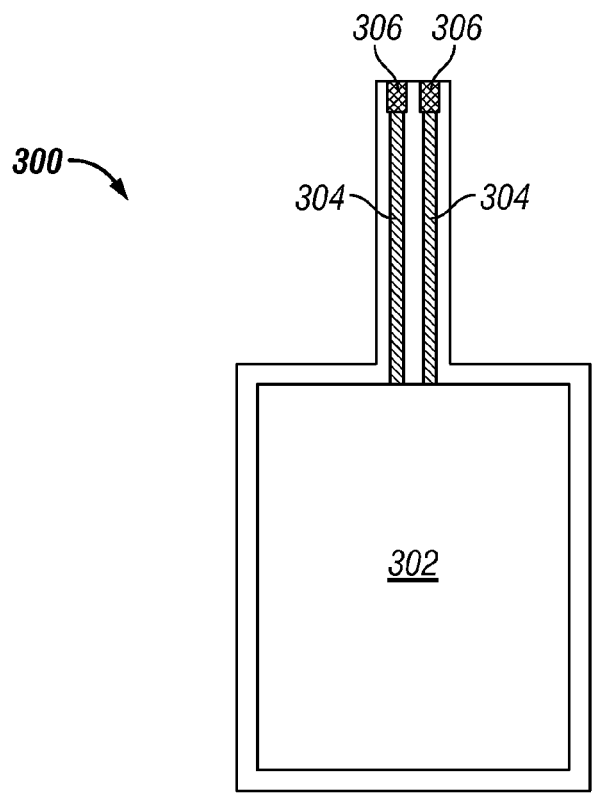
FIG. 3 is a top view of an exemplary force sensor that is suitable for use with a foot pedal assembly.

FIG. 3 is a top view of an exemplary force sensor 300 that is suitable for use with a foot pedal assembly. Indeed, the sensor 230 (see FIG. 2) may be configured as shown in FIG. 3. An embodiment of the force sensor 300 could be obtained from a variety of manufacturers, such as SparkFun Electronics of Boulder, Colo. The force sensor 300 includes a main sensing area 302 and two electrical conductors 304 that end at contacts 306. The electrical conductors 304 are electrically coupled to the resistive element(s) located in the main sensing area 302. The resistance of the force sensor is measured between the two contacts 306. This measured resistance will have a certain range of values when no force is applied to the main sensing area 302, and a different range of values when force is applied to the main sensing area 302. In one exemplary embodiment, the resistance between the contacts 306 is very high (virtually an open circuit) when no force is applied, and the resistance is relatively low (between about 100 to 300 ohms) when force is applied. It should be appreciated that these resistance ranges are merely exemplary, and that the actual resistance of the force sensor 300 will depend upon the particular design, manufacturing technique, materials used, and the like.

Although the force sensor 300 could be designed for operation in a binary mode having two distinguishable states, it may be desirable to employ a force sensor that is capable of detecting or measuring the amount of force applied thereto, within a specified range. For example, it may be beneficial for the system to be able to detect when the foot pedal reaches the end of its physical travel range, and/or whether the driver has applied an unusually high amount of force at that point.

The contacts 306 serve as connection points for electrical leads or wires. As shown in FIG. 2, the sensor 230 may cooperate with electrical leads 232 that enable the communication of sensor signals, the monitoring of the sensor 230, etc. Although not required, the leads 232 could be routed in an appropriate manner such that they can be terminated at the same connector 214 that accommodates the electrical leads 212.

In addition to (or in lieu of) a pedal-mounted sensor such as the sensor 230, an embodiment of a foot pedal system could utilize one or more wireless detectors or sensors that are located in the footwell of the vehicle. Referring again to FIG. 1, the illustrated vehicle includes a wireless detector 120 located in the footwell 100. Notably, the wireless detector 120 need not (and preferably is not) mechanically coupled to or otherwise affixed to any of the foot pedals 102, 104, 106. Rather, this particular embodiment has the wireless detector 120 mounted to the center console trim, which is at or near the interior tunnel.

The wireless detector 120 is suitably configured to detect the physical and actual presence of an actuating object (e.g., the driver's foot, the driver's leg, or a mechanical link) engaged with the foot pedal of interest. In practice, the wireless detector 120 and associated control logic could be designed to detect whether or not the driver's foot is touching the foot pedal, whether or not the driver's foot is pressing down on the foot pedal, whether or not the driver's leg is in a position that would normally be indicative of actuation of the foot pedal, etc. In this regard, the wireless detector 120 might be configured to scan or otherwise interrogate the space defined by the footwell 100 using appropriate wireless scanning, interrogation, sensing, or detecting techniques. For example, the wireless detector 120 might include or be realized as one or more of the following elements, without limitation: an infrared detector; a laser detector; an ultrasonic detector; a magnetic detector; a camera; or a heat detector. It should be appreciated that the wireless detector 120 and the associated controller could leverage known scanning, object sensing, and physical proximity detection techniques and technologies to determine whether or not the foot pedal of interest is being actuated voluntarily by an operator. The operation of the wireless detector 120 and the manner in which its sense signals are obtained, processed, and analyzed will not be described in detail here.

Figure 4:
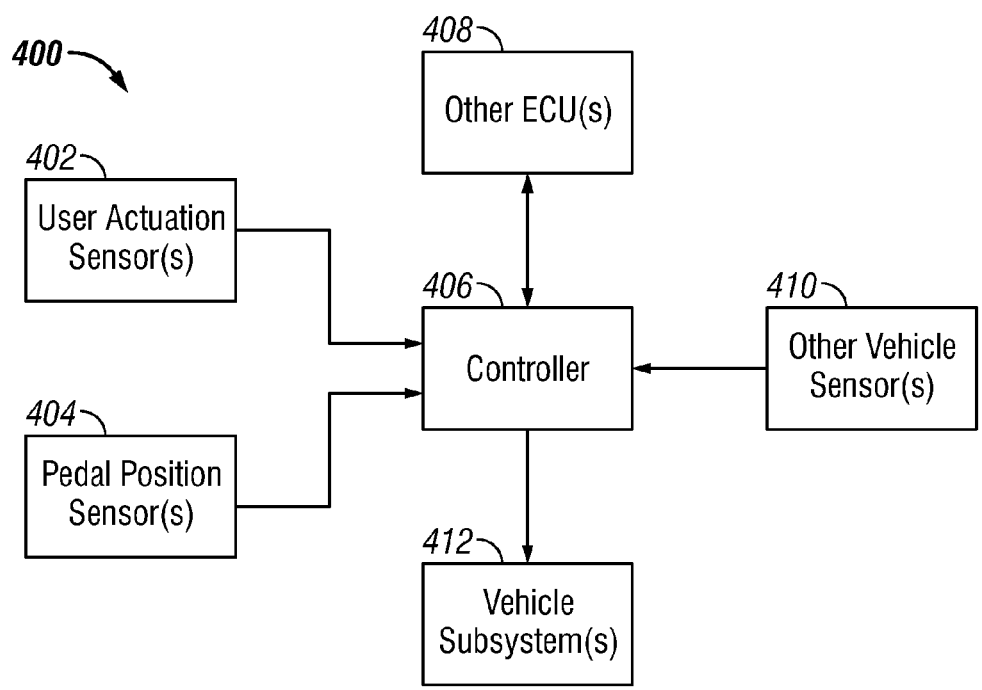
FIG. 4 is a schematic representation of an exemplary vehicle control system.

As mentioned previously, one or more user actuation sensors can be deployed and used in a manner that is independent of, distinct from, and unaffected by the usual position sensors that are used to determine the physical position of the foot pedal of interest. A pedal system as described here can leverage information obtained from an actuation sensor to control the operation of the host vehicle in a manner that is influenced by the state of the actuation sensor. In this regard, FIG. 4 is a schematic representation of an exemplary vehicle control system 400 that could be utilized with a pedal system as described here. The illustrated embodiment of the system 400 includes, without limitation: at least one user actuation sensor 402 having the general features, characteristics, and functionality described above; at least one pedal position sensor 404; a controller 406 and/or processor module; one or more other vehicle ECUs 408; one or more other vehicle sensors 410; and one or more vehicle subsystems 412, devices, equipment, or features that could be controlled, managed, or otherwise influenced by the controller 406. The various elements and components of the system 400 may be coupled together using any appropriate interconnection architecture, such as a data communication bus, wires, and/or electrical conductors to accommodate the provision of supply voltages, data communication, control message communication, sensor signal communication, etc.

FIG. 4 depicts a generalized embodiment where any type of user actuation sensor 402, and any number, could be used. In this regard, the sensor 230 and/or the wireless detector 120 could be used for the user actuation sensor 402. The pedal position sensor 404 represents the conventional sensor that is used to determine the physical position and/or the amount of physical travel of the foot pedal under consideration. Thus, the system 400 could utilize a plurality of user actuation sensors 402 and a plurality of pedal position sensors 404 if needed to monitor more than one foot pedal of the vehicle.

The controller 406 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. The controller 406 may be realized as a microprocessor, a controller, a microcontroller, or a state machine. Moreover, the controller 406 may be implemented as a combination of computing devices, e.g., a combination of a digital signal processor and a microprocessor, a plurality of microprocessors, one or more microprocessors in conjunction with a digital signal processor core, or any other such configuration.

In certain embodiments, the controller 406 is implemented in an ECU of the vehicle, such as the engine control module. This enables the controller 406 to alter, regulate, control, or influence one or more operating characteristics of the vehicle (in particular, the vehicle subsystems 412) in response to the output, status, state, or condition of the user actuation sensor 402 and/or the pedal position sensor 404. As depicted in FIG. 4, the controller 406 may cooperate with other ECUs 408 of the vehicle and with other vehicle sensors 410 if needed for purposes of controlling, adjusting, or otherwise influencing the operation of the vehicle subsystems 412. For example, the controller 406 may be suitably configured to initiate, manage, or control certain corrective actions related to the pedal system (and/or other vehicle subsystems 412) when necessary.

Figure 5:
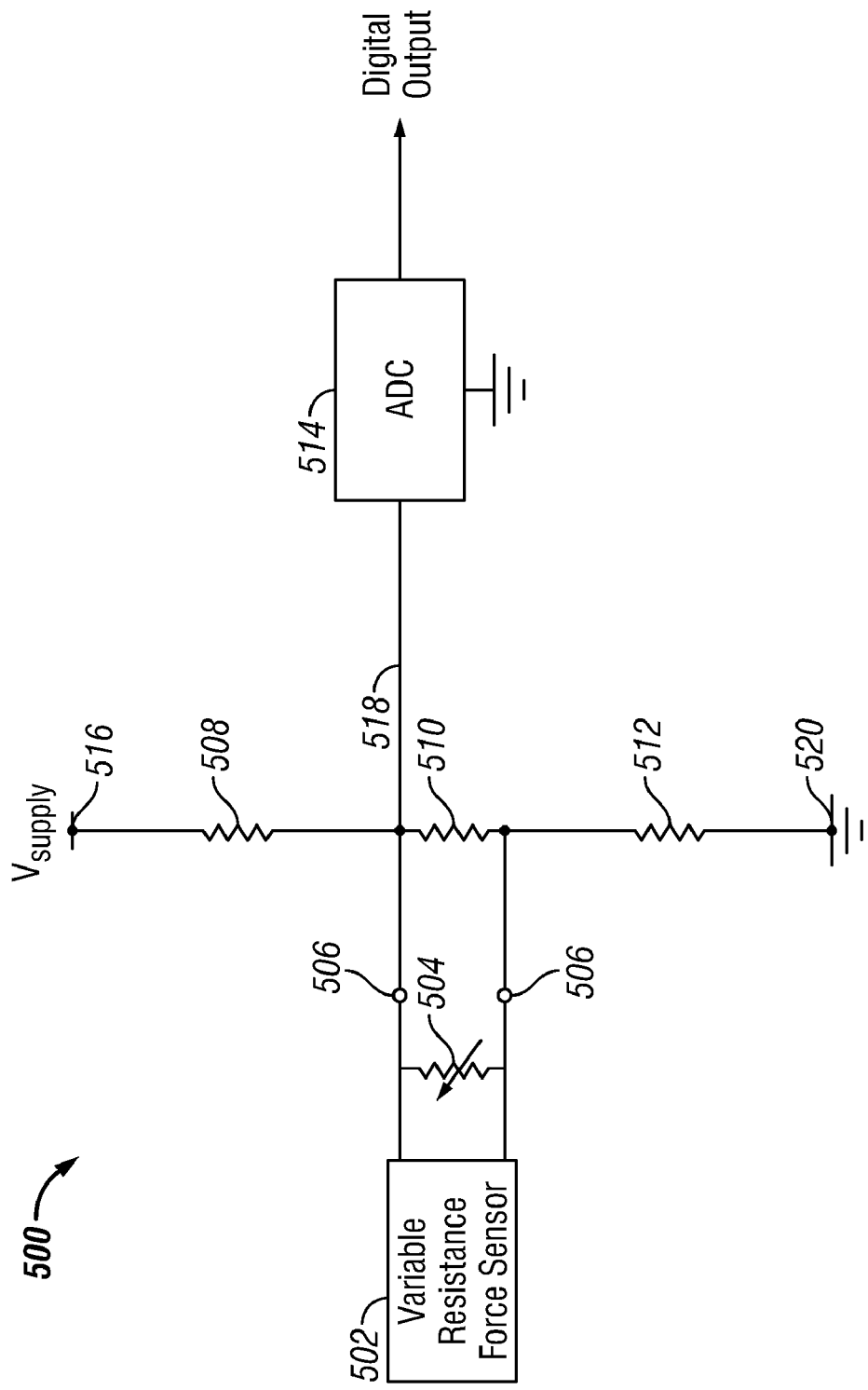
FIG. 5 is a diagram of an exemplary sensor detection circuit.

In certain embodiments, the controller 406 includes or cooperates with a suitably configured sensor detection circuit that is coupled to the user actuation sensor 402. In this regard, FIG. 5 is a diagram of an exemplary sensor detection circuit 500 that is suitable for use with a variable resistance force sensor 502 of the type described previously. It should be appreciated that different sensor detection circuit topologies can be implemented if needed for compatibility with the particular type of user actuation sensor 402, for compatibility with the available vehicle supply voltages, and other practical considerations. Moreover, a portion or all of the sensor detection circuit 500 (e.g., the resistors and wiring) could be integrally formed into the force sensor itself, rather than being implemented with a distinct component.

FIG. 5 depicts the variable resistance 504, which represents the resistance of the force sensor 502 itself, and the two connection terminals 506 of the force sensor 502. The variable resistance 504 is defined as the resistance between the two connection terminals 506. The sensor detection circuit 500 is electrically coupled to the connection terminals 506 of the force sensor 502 as shown. This particular embodiment of the sensor detection circuit 500 includes, without limitation: a pull-up resistor 508; a parallel terminal resistor 510; a pull-down resistor 512; and an analog-to-digital converter (ADC) element 514. In one exemplary working embodiment, the pull-up resistor 508 is 187 kilo-ohms, the parallel terminal resistor 510 is 272.5 kilo-ohms, and the pull-down resistor 512 is 47.7 kilo-ohms. The pull-up resistor 508 is coupled between a supply voltage node 516 and an ADC input node 518. The ADC input node 518 is coupled to one of the connection terminals 506. The parallel terminal resistor 510 is coupled across the two connection terminals 506 such that it appears in parallel with the variable resistance 504 of the force sensor 502. The pull-down resistor is coupled between the parallel terminal resistor 510 and a reference voltage node 520. Although not always required, five volts is provided at the supply voltage node 516, and the reference voltage node 520 is grounded.

The voltage present at the ADC input node 518 represents the sensor signal from the force sensor 502, and the ADC element 514 generates a digital output that corresponds to a digital representation of its analog input voltage. The output bit resolution of the ADC element 514 may be chosen to suit the needs and specifications of the particular application. Notably, the analog input voltage to the ADC element 514 will vary as the variable resistance 504 changes. In this regard, the pull-up resistor 508, the parallel terminal resistor 510 combined with the variable resistance 504, and the pull-down resistor 512 together form a simple voltage divider circuit. For this example, when no actuation force is applied to the force sensor 502, the variable resistance 504 is very high (emulating an open circuit condition at the connection terminals 506). In practice, the variable resistance 504 may be within the range of about 100 kilohms to about 300 kilohms when no actuation force is present. For this state of the force sensor 502, the effect of the variable resistance is negligible in the parallel combination with the parallel terminal resistor 510, and, therefore, the voltage at the ADC input node 518 will be determined primarily by the voltage divider formed by the pull-up resistor 508, the parallel terminal resistor 510, and the pull-down resistor 512.

Conversely, when actuation force is applied to the force sensor 502, the variable resistance 504 is relatively low. In practice, the variable resistance 504 may be within the range of about 100 ohms to about 200 ohms when no actuation force is present. For this state of the force sensor 502, the variable resistance will have a greater impact on the voltage at the ADC input node 518. More specifically, the ADC input voltage will be influenced by the parallel combination of the variable resistance 504 and the parallel terminal resistor 510. Consequently, the ADC input voltage will be lower when actuation force is applied to the force sensor 502, compared to when no actuation force is applied. The sensor detection circuit 500 is designed to detect this difference in voltage.

The resistance values for the pull-up resistor 508, the parallel terminal resistor 510, and the pull-down resistor 512 can be selected for compatibility and matching with the force sensor 502, for compatibility and matching with the ADC element 514, and to provide the desired analog voltage levels for the different sensor states. For example, it may be desirable to keep the ADC input voltage within the range of about two to four volts. Moreover, the resistor values can be selected to provide a reliable and detectable difference between the voltage levels for the different sensor states. In certain implementations, the system includes diagnostic capabilities wherein detected voltages outside of the desired range (e.g., two to four volts) indicate that corrective action should be taken. For example, voltages outside of the desired range might indicate that the sensor needs to be recalibrated, repaired, or replaced.

Figure 6:
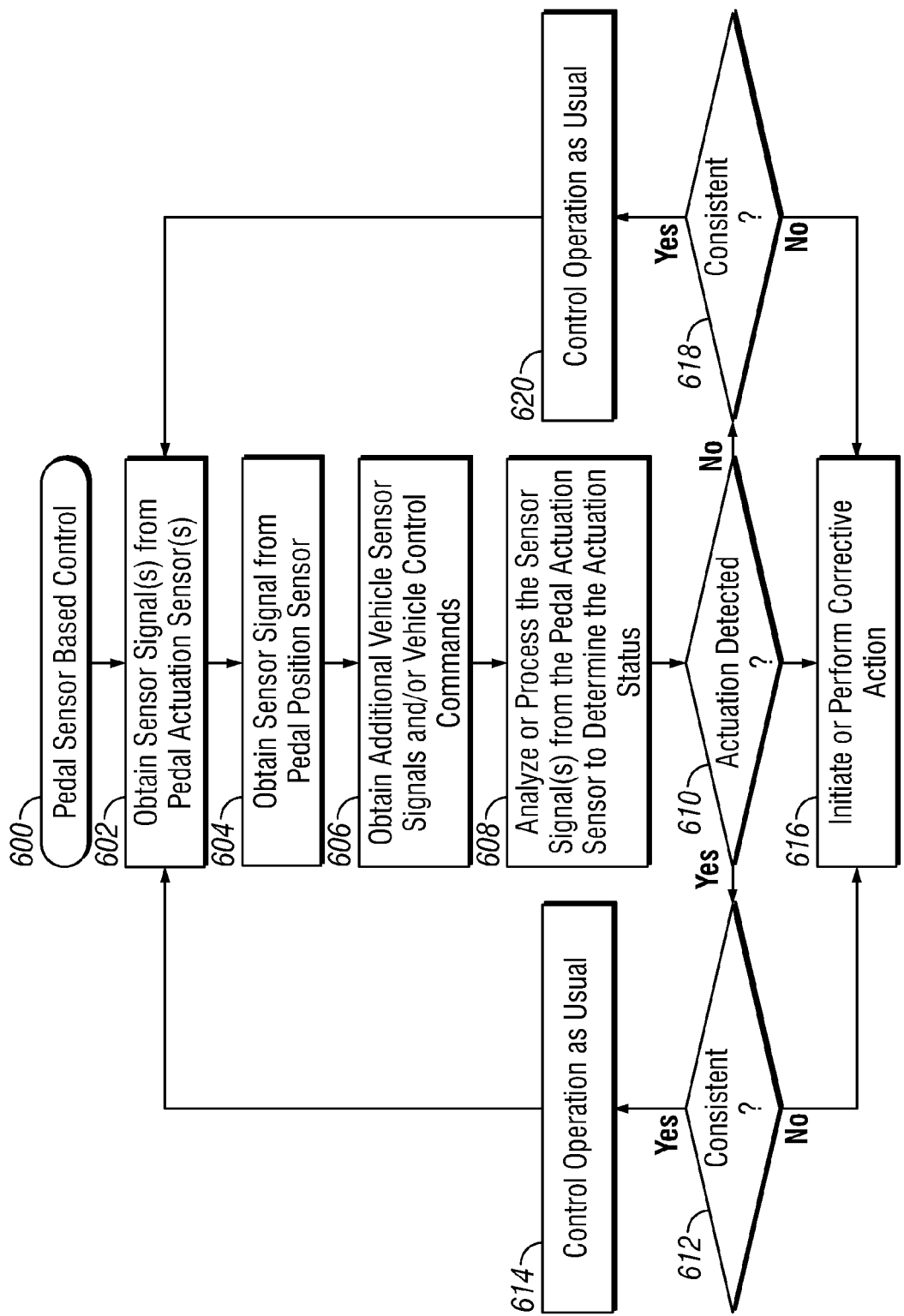
FIG. 6 is a flow chart that illustrates an exemplary embodiment of a pedal sensor based control process.

The user actuation sensor(s), control system, and sensor circuit described herein can be used in various methods of controlling the operation of the host vehicle. In this regard, FIG. 6 is a flow chart that illustrates an exemplary embodiment of a pedal sensor based control process 600. The various tasks performed in connection with the process 600 may be performed by software, hardware, firmware, or any combination thereof. For illustrative purposes, the following description of the process 600 may refer to elements mentioned above in connection with FIGS. 1-5. In practice, portions of the process 600 may be performed by different elements of the described system, e.g., a controller, an ECU, a sensor detection circuit, or a vehicle subsystem. It should be appreciated that the process 600 may include any number of additional or alternative tasks, the tasks shown in FIG. 6 need not be performed in the illustrated order, and the process 600 may be incorporated into a more comprehensive procedure or process having additional functionality not described in detail herein. Moreover, one or more of the tasks shown in FIG. 6 could be omitted from an embodiment of the process 600 as long as the intended overall functionality remains intact.

The process 600 can be performed in an ongoing manner while the vehicle is being operated. In practice, the functionality of the process 600 could be disabled when the engine/vehicle speed is being regulated by the cruise control feature of the vehicle (because the driver often removes his or her foot from the accelerator pedal when cruise control is active). As an example, when cruise control is being used, the user-actuation sensor mounted to a brake pedal could still be employed to stop the cruise control system, in addition to physically depressing the brake or switching off the cruise control system.

This particular embodiment of the process 600 obtains, receives, or monitors sensor signals from at least one pedal actuation sensor associated with one or more foot pedals (task 602). As noted previously, the pedal actuation sensor signal is generated in a manner that is independent of, and not influenced by, the actual physical position of the foot pedal. Moreover, pedal actuation sensor signals are obtained in a manner that is independent of, and not influenced by, the calculated or detected physical position of the foot pedal. The process 600 may also obtain, receive, or monitor a sensor signal from a traditional pedal position sensor (task 604). The traditional pedal position sensor signal enables the system to independently determine the current physical position of the foot pedal in a conventional manner, and to control the operation of the vehicle (e.g., for braking, clutch, or engine/vehicle speed control) in response to the current physical position of the foot pedal. It should be understood that the determination of the current physical position of the foot pedal need not (and preferably does not) utilize the pedal actuation sensor or the pedal actuation sensor signal. The process 600 may also obtain, receive, or monitor any number of additional vehicle sensor signals and/or vehicle control commands (task 606). These additional signals and/or commands could be used if needed to determine how best to control the operation of the vehicle, with or without the additional consideration of the pedal actuation sensor signals.

The process 600 continues by analyzing or processing the pedal actuation sensor signal (task 608) to determine a user actuation status of the foot pedal (or, equivalently, an actuation state of the pedal actuation sensor). If the pedal actuation sensor signal is indicative of user actuation (query task 610), then the process may perform a check to determine whether or not the detected actuation status is consistent (query task 612) with other monitored sensor signals, vehicle status, vehicle operating conditions, etc. If query task 612 determines that the detected user actuation status is consistent with other indicators, then the process 600 will control the operation of the vehicle in a manner that is dictated by the consistent information and sensor data (task 614). Accordingly, controlling the operation of the vehicle may be performed in response to both the user actuation status of the foot pedal, as indicated by the pedal actuation sensor signal, and the current physical position of the foot pedal, as indicated by the pedal position sensor signal. For example, if a vehicle/engine speed related control signal monitored by the system indicates a command to increase the vehicle/engine speed and the detected user actuation status indicates that force is being applied to the accelerator pedal, then task 614 may be associated with normal speed control operation to carry out the desired amount of speed adjustment.

If query task 612 determines that the detected user actuation status is inconsistent with other indicators, then the process 600 initiates or performs corrective action (task 616). In certain embodiments, corrective action is taken when the user actuation status is inconsistent with the current physical position of the foot pedal, as indicated by the pedal position sensor signal. For example, corrective action will be initiated for the vehicle when both: (1) the sensor detection circuit detects the state corresponding to no actuation force; and (2) the current physical position of the foot pedal corresponds to an actuated position. As another example, corrective action will be taken when both: (1) the sensor detection circuit detects the state corresponding to no actuation force; and (2) the electronic vehicle/engine speed control system is issuing a control signal that indicates an increase in vehicle/engine speed.

The specific type of corrective action initiated by the process 600 will depend upon the current status and state of the vehicle, the type of sensor signal inconsistency detected, and other factors. In certain embodiments, the corrective action may be one or more of the following actions, without limitation: generating a message on a display of the vehicle; generating an alert indication; limiting top speed of the vehicle; limiting engine speed of the vehicle; lowering engine output power; limiting response range of the foot pedal; deactivating, disabling, or powering down certain functions or capabilities of the engine, power train, and/or other subsystems; shifting gears; and shifting to a neutral gear.

If query task 610 instead determines that the pedal actuation sensor signal is indicative of no user actuation, then the process 600 may perform a check to determine whether or not the detected status is consistent (query task 618) with other monitored sensor signals, vehicle status, vehicle operating conditions, etc. If query task 618 determines that the detected "no actuation" status is consistent with other indicators, then the process 600 will control the operation of the vehicle in a manner that is dictated by the consistent information and sensor data (task 620). Accordingly, the process 600 may result in different control operations, depending upon whether or not the user actuation status indicates actuation or no actuation of the foot pedal. For example, if a related control signal monitored by the system indicates an idling command and the detected user actuation status indicates that no force is being applied to the accelerator pedal, then task 620 may be associated with normal control operation that idles the engine. If query task 618 determines that the detected user actuation status is inconsistent with other indicators, then the process 600 initiates or performs corrective action (task 616), as described previously.

The controller responsible for the techniques and processes described above may perform an adaptive calibration routine (periodically or when needed) to account for normal and ordinary drifting of the force sensor and/or other onboard sensors. For example, the controller could perform a "zero force" calibration at a time when the foot pedal is normally not being manipulated. In this regard, the zero force calibration may be initiated automatically at a specified time after the ignition has been turned off and/or at a time when other subsystems or vehicle sensors have indicated that the vehicle is no longer being operated. During the zero force calibration routine, the controller analyzes the force sensor signal, its resistance, and/or the ADC input voltage. If the analyzed quantity falls within specification or within some designated range of values, then the controller assumes that the force sensor is still calibrated. If, however, the force sensor has drifted out of calibration, then the controller can recalibrate the sensing circuit by establishing a new voltage or voltage range that corresponds to the zero force condition. In addition, the voltage or voltage range corresponding to the actuation force condition could also be recalibrated. If the controller determines that the force sensor has drifted too far, then it may generate a warning or a diagnostic alarm.

The foot pedal actuation monitoring techniques and technologies presented here can be deployed in any vehicle, and for any or all of the foot pedals. The foot pedal actuation sensor technology provides an additional indicator of foot pedal actuation, which can be used to enhance one or more vehicle control algorithms and/or to supplement existing safety and diagnostic systems.

To summarize, one or more of the following sensor techniques and technologies could be implemented:

An individual force sensor that covers a portion of or an entire pedal surface (the user interface) that translates applied force into a given resistance.

An individual position sensor that covers a portion of or an entire pedal surface that translates the position of the user's foot on the pedal into two resistance values, one in the X direction and one in the Y direction.

An individual "presence" sensor that covers a portion of or an entire pedal surface (the user interface) whose capacitance changes when different objects contact it.

An individual position sensor that covers a portion of or an entire pedal surface that translates the position of the user's foot on the pedal into two capacitance values, one in the X direction and one in the Y direction.

Multiple force sensors organized into a grid or some other pattern or array which would detect force being applied to different regions of the pedal. This could act as a force and position sensor and might require additional electronics/wiring to interpret the user's actions and communicate this to the ECU or logic system that governs the vehicle/engine.

An infrared sensor mounted in the driver's side foot-well of the vehicle. By using this type of sensor, an ECU could determine whether the user is extending his/her foot or if the foot is resting somewhere away from a pedal (assuming the driver's body temperature is measurably different than the surrounding environment). This could also be used to see which pedal is being pressed, for example, if the infrared imaging sensor detects the user's foot to the right side of the foot-well, then the ECU can determine that the user is using or intends to use the accelerator pedal, etc.

Ultrasonic-range finder sensors could be used to determine whether a foot (or any other object) is in its range in the foot-well. If there is no foot detected, the sensor reads its full range (approximately 0.8 meters). If there is a foot in the sensing range, the sensor will output a voltage that corresponds to a shorter distance, e.g., 0.2 meters.

Laser trip-beams, such as those that are used with garage door safety systems, could be located in the foot-well of the vehicle to detect whether the user has "broken the beam", which would indicate that the user has extended a foot to actuate a control pedal.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A pedal apparatus for a vehicle, the pedal apparatus comprising:
   a foot pedal configured for physical movement in response to actuation; and
   a sensor associated with the foot pedal, the sensor configured to detect user actuation of the foot pedal, and lack thereof, independently of physical position of the foot pedal; wherein:
   the foot pedal is located in a footwell of the vehicle; and
   the sensor comprises a wireless detector located in the footwell, the wireless detector configured to detect presence of an actuating object engaged with the foot pedal.

2. The pedal apparatus of claim 1, the wireless detector comprising a detector selected from the group consisting of: an infrared detector; a laser detector; an ultrasonic detector; a magnetic detector; a camera; and a heat detector.

3. The pedal apparatus of claim 1, further comprising a controller coupled to the sensor, the controller configured to alter an operating characteristic of the vehicle in response to output of the sensor.

4. A method of controlling operation of a vehicle having a foot pedal configured for physical movement in response to actuation, the method comprising:
   obtaining a sensor signal from a user actuation sensor associated with the foot pedal, the sensor signal generated in a manner that is independent of, and not influenced by, physical position of the foot pedal;
   analyzing the sensor signal to determine a user actuation status of the foot pedal;
   determining a current physical position of the foot pedal independently of obtaining the sensor signal; and
   controlling operation of the vehicle in response to the user actuation status of the foot pedal; wherein:
   controlling operation of the vehicle is performed in response to both the user actuation status of the foot pedal and the current physical position of the foot pedal;
   controlling operation of the vehicle comprises initiating a corrective action when the user actuation status is inconsistent with the current physical position of the foot pedal; and
   the corrective action comprises an action selected from the group consisting of: generating a message on a display of the vehicle; generating an alert indication; limiting top speed of the vehicle; limiting engine speed of the vehicle; lowering engine output power; limiting response range of the foot pedal; shifting gears; and shifting to a neutral gear.

5. The method of claim 4, wherein controlling operation of the vehicle comprises:
   performing a first control operation when the user actuation status indicates actuation of the foot pedal; and
   performing a second control operation when the user actuation status indicates no actuation of the foot pedal.

6. A pedal system for a vehicle, the pedal system comprising:
   an accelerator pedal having a footpad, the accelerator pedal configured for physical movement in response to actuation of the footpad;
   a sensor coupled to or integrated into the footpad, the sensor having a first state when the footpad is actuated and having a second state when the footpad is not actuated, and the sensor being independent of and distinct from any physical position sensors of the accelerator pedal;
   a sensor detection circuit electrically coupled to the sensor, the sensor detection circuit configured to distinguish between the first state and the second state; and
   a controller coupled to the sensor detection circuit, the controller configured to control operation of the vehicle in a manner that is influenced by the first state or the second state; wherein:
   the controller monitors at least one vehicle/engine speed related control signal of the vehicle; and
   the controller is configured to initiate a corrective action for the vehicle when detection of the second state is inconsistent with the at least one vehicle/engine speed related control signal.

7. The pedal system of claim 6, wherein the sensor comprises an electronic force sensor having a variable resistance that is influenced by force applied thereto.

8. The pedal system of claim 6, wherein the controller is configured to independently determine a current physical position of the accelerator pedal without utilizing the sensor, and control operation of the vehicle in response to the current physical position of the foot pedal.

9. The pedal system of claim 8, wherein the controller is configured to initiate a corrective action for the vehicle when both: (1) the sensor detection circuit detects the second state; and (2) the current physical position of the accelerator pedal corresponds to an actuated position.

10. The pedal system of claim 6, wherein the corrective action comprises an action selected from the group consisting of: generating a message on a display of the vehicle; generating an alert indication; limiting top speed of the vehicle; limiting engine speed of the vehicle; lowering engine output power; limiting response range of the accelerator pedal; shifting gears; and shifting to a neutral gear.

* * * * *